(12) United States Patent
Rastogi et al.

(10) Patent No.: US 11,379,532 B2
(45) Date of Patent: Jul. 5, 2022

(54) SYSTEM AND METHOD FOR GENERATING A RECOMMENDATION

(71) Applicant: The Toronto-Dominion Bank, Toronto (CA)

(72) Inventors: Mansi Rastogi, Toronto (CA); Jane Holtslander, Toronto (CA); Michael Doyle, Toronto (CA); Kristopher Okera Gibbs, Toronto (CA); Mary Ann Duarte, Ajax (CA); Tonja Selena Launen, Toronto (CA); Alla Chichkina, Toronto (CA); Ellen Rebecca Heise, Toronto (CA); Anna Anatolievna Sakoun, Richmond Hill (CA); Seonaid Marlaine Eggett, Toronto (CA); Paul Thomas McGhee, Burlington (CA); Chantale Oliveira, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 187 days.

(21) Appl. No.: 16/655,437

(22) Filed: Oct. 17, 2019

(65) Prior Publication Data

US 2021/0117477 A1    Apr. 22, 2021

(51) Int. Cl.
*G06F 16/9035* (2019.01)
*G06Q 20/40* (2012.01)

(52) U.S. Cl.
CPC ..... *G06F 16/9035* (2019.01); *G06Q 20/4014* (2013.01)

(58) Field of Classification Search
CPC .............. G06F 16/9035; G06Q 20/4014
(Continued)

(56) References Cited

U.S. PATENT DOCUMENTS 6,349,290 B1    2/2002 Fetta
9,519,896 B2    12/2016 Depietro
(Continued)

FOREIGN PATENT DOCUMENTS

WO    WO2000/73955 A2    12/2000

OTHER PUBLICATIONS

Hallberg, Josef, et al., "Profile Management for Dynamic Groups", Intelligent Patient Management, SCI 189, © Springer-Verlag, Heidelberg, Germany, 2009, pp. 297-313.*
(Continued)

*Primary Examiner* — Robert Stevens
(74) *Attorney, Agent, or Firm* — Rowand LLP

(57) ABSTRACT

A method of generating recommendations for a collective profile, the collective profile being linked to a first profile and a second profile. The method may include authenticating a login request from an end user device in association with the collective profile based on credentials associated with the first profile, identifying a query from among a plurality of queries and transmit the query to the end user device, receiving a response to the query, determining that the response is not inconsistent with one or more earlier responses received in association with the second profile and, in response, refining at least one attribute or goal in the collective profile based on the response to generate and store a refined collective profile, and determining whether the refined collective profile results in a new recommendation and, if so, outputting the new recommendation.

20 Claims, 7 Drawing Sheets

(58) Field of Classification Search
USPC .......................................................... 707/734
See application file for complete search history.

(56) References Cited

U.S. PATENT DOCUMENTS

| | | |
|---|---|---|
| 2005/0187802 A1 | 8/2005 | Koeppel |
| 2007/0233671 A1* | 10/2007 | Oztekin .............. G06F 16/9535 |
| 2008/0091530 A1 | 4/2008 | Byal |
| 2008/0109378 A1 | 5/2008 | Papadimitriou |
| 2013/0191195 A1 | 7/2013 | Stan |
| 2014/0244457 A1 | 8/2014 | Buttonow |
| 2017/0093967 A1* | 3/2017 | Grosz ..................... H04L 51/32 |

OTHER PUBLICATIONS

Middleton, Stuart E., et al., "Ontological User Profiling in Recommender Systems", ACM Transactions on Information Systems, vol. 22, No. 1, Jan. 2004, pp. 54-88.*

Daoud, Mariam, et al., "Towards a graph-based user profile modeling for a session-based personalized search", Knowl. Inf. Syst., vol. 21, © Springer-Verlag London Ltd., 2009, pp. 365-398.*

* cited by examiner

SYSTEM AND METHOD FOR GENERATING A RECOMMENDATION

FIELD

This relates to recommendation systems and methods and, in particular, to recommendation determinations in association with profiles that are related to one or more accounts within a system.

BACKGROUND

Online accounts are often associated with a user profile. The entity offering the online accounts may have related products and or services available that may be relevant to a user that has an online account. A number of such systems attempt to generate recommendations for a user. For example, a user's online activity may be mined for information regarding their needs, such as through search terms used, and suitable products or services recommended.

In the case of the financial industry and financial accounts, the bank or other institution has financial computing systems containing vast quantities of data regarding individual account holders and their activities. It would be advantageous to leverage that and to better appreciate the circumstances of individual account holders to provide improved recommendations regarding products and services. Additional complications arise in the case of collective accounts or profiles that are related to a plurality of individual accounts or profiles, since attributes and goals may conflict.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
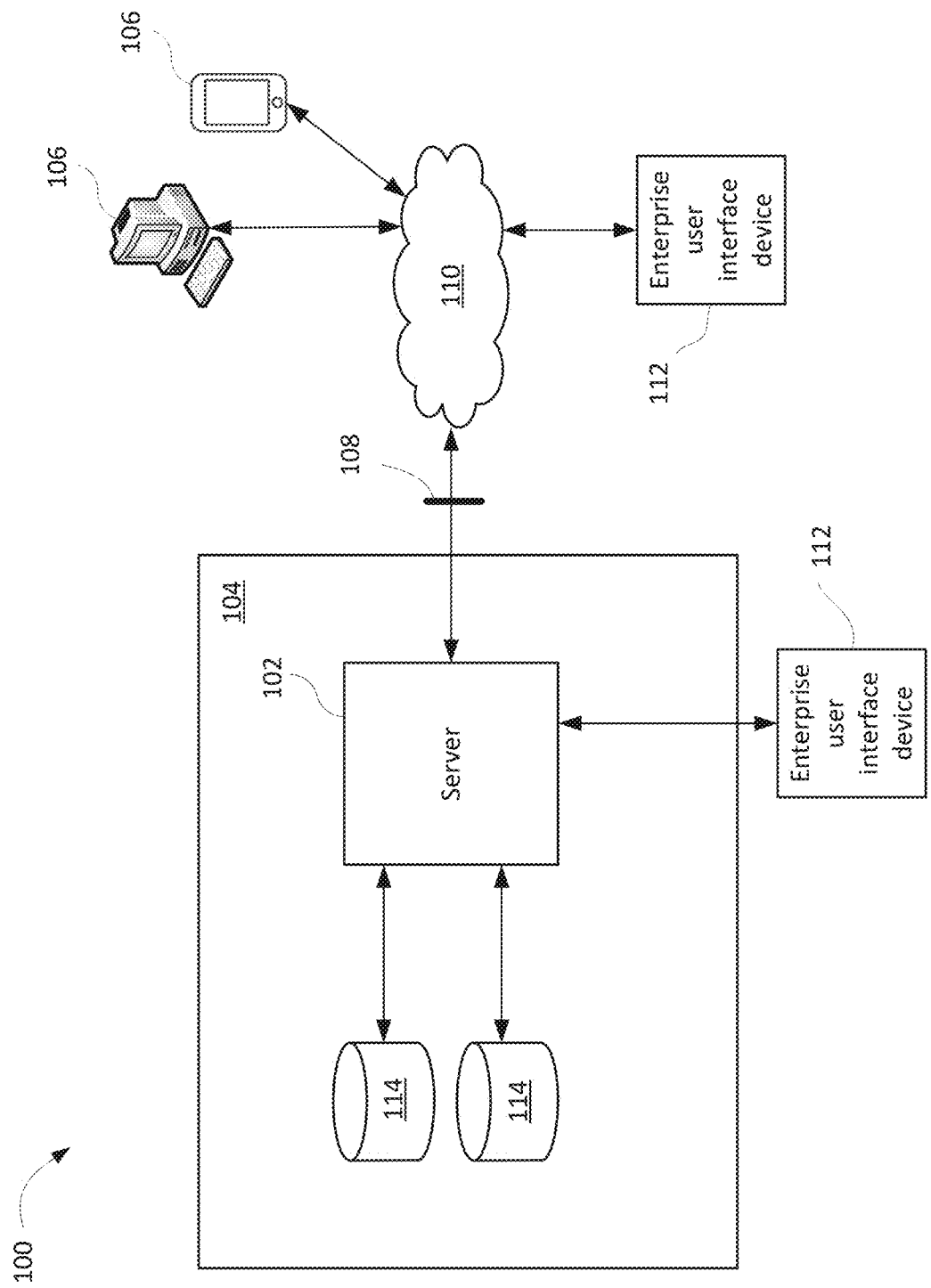
FIG. 1 is a schematic diagram illustrating an operating environment of an example embodiment.

In one aspect, the present application describes a server computer system that includes a persistent storage containing at least a first profile, a second profile and a collective profile linked to the first profile and to the second profile; a processor coupled to the persistent storage; and a memory coupled to the processor, the memory storing instructions. The instruction, when executed, are to configure the processor to authenticate a login request from an end user device in association with the collective profile based on credentials associated with the first profile; identify a query from among a plurality of queries and transmit the query to the end user device; receive a response to the query; determine that the response is not inconsistent with one or more earlier responses received in association with the second profile and, in response, refine at least one attribute or goal in the collective profile based on the response to generate and store a refined collective profile; and determine whether the refined collective profile results in a new recommendation and, when so, outputting the new recommendation.

In some implementations, the instructions, when executed, may further configure the processor to output data to the end user device for display on a graphical user interface, the data including attributes, account information and goals stored in the collective profile and the first profile, and including at least some shared data from the second profile and excluding at least some private data from the second profile. In some cases, the shared data in the second profile may include associated permissions set to permit sharing of the shared data with the collective profile, and the private data in the second profile may include associated permissions set to prevent sharing of the shared data with the collective profile In some implementations, the instructions, when executed, may further configure the processor to test whether the response is consistent with attributes or goals stored in the first profile and, when not, to output a notification to the end user device.

In some implementations, the instructions, when executed, may further configure the processor to test whether the response is consistent with attributes or goals stored in the second profile and, when not, to output a notification to the end user device.

In some implementations, the instructions, when executed, may further configure the processor to identify a second query from among the plurality of queries and transmit the query to the end user device; receive a second response to the second query; and determine that the second response is inconsistent with a second earlier response received in association with the second profile and, in response, transmitting a first notification to the end user device and a second notification to an address associated with the second profile, the first notification and the second notification advising that an inconsistency is detected in building of the collective profile.

In some implementations, the instructions, when executed, may further configure the processor to output the new recommendation by sending a notification to an address associated with the new recommendation. In some cases, the instructions, when executed, are to further configure the processor to send the notification to the address associated with the new recommendation by identifying a customer service representative associated with a product or service identified in the new recommendation and determining the address associated with the customer service representative. The notification may include data highlighting the at least one attribute or goal refined in the collective profile that results in the new recommendation.

In some implementations, the instructions, when executed, may further configure the processor to identify a query by determining that the collective profile is incomplete, retrieving a query history stored in association with the collective profile, and identifying a next query in a series of queries among the plurality of queries for which no response has been received in association with the first profile.

In some implementations, wherein the instructions, when executed, may further configure the processor to identify a query by detecting a trigger event in association with a goal contained in, or an account linked to, the collective profile. The trigger event may include one or more of an increase in value of the account over a first level, a transaction in the account over a maximum quantity, a change of more than a second amount in a regular transaction in the account, or a completion of the goal.

In another aspect, the present application describes a computer-implemented method that may include storing, in memory, a first profile, a second profile and a collective profile linked to the first profile and to the second profile; authenticating a login request from an end user device in association with the collective profile based on credentials associated with the first profile; identifying a query from among a plurality of queries and transmit the query to the end user device; receiving a response to the query; determining that the response is not inconsistent with one or more earlier responses received in association with the second profile and, in response, refining at least one attribute or goal in the collective profile based on the response to generate and store a refined collective profile; and determining whether the refined collective profile results in a new recommendation and, when so, outputting the new recommendation.

According to another aspect of the present application, there may be provided a computer-readable medium having stored thereon computer-executable instructions that, when executed, cause one or more computing devices to carry out one or more of the functions or processes described herein.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an example operating environment 100. The environment 100 includes a server computer system 102 in an enterprise network 104. End user devices 106 may be able to access services provided by the server computer system 102 via a public network 110, such as the Internet. The enterprise network 104 may include a firewall 108 in some cases to protect against unauthorized access and to provide other security or traffic management operations. Enterprise user interface devices 112 may access services provided by the server computer system 102. In some cases, the enterprise user interface devices 112 may access those services from within the enterprise network 104 and in some cases, the enterprise use interface devices may access those services from outside the enterprise network 104 via the public network 110. The enterprise network 104 may further include a plurality of databases 114 storing user and account information, and that are accessible to the server computer system 102.

As examples, the end user devices 106 may include a personal computer and a smartphone. In some implementations, one or both of the end user devices 106 may be a computing device of another type such as a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays), and any other type of computing device that may be configured to store data and software instructions, and execute software instructions to perform operations consistent with disclosed embodiments. Similarly, the enterprise user interface devices 112 may include any suitable computing device, including a personal computer, a smartphone, a laptop computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), and any other type of computing device that may be configured to store data and software instructions, and execute software instructions to perform operations consistent with disclosed embodiments.

The server computer system 102 is a computing device that provides services to one or more client devices including, for example, one or both of the end user devices 106 and the enterprise user interface devices 112. The server computer system 102 may, for example, be a mainframe computer, a minicomputer, or the like. In some implementations, the server computer system 102 may be formed of or may include one or more computing devices. The server computer system 102 may include and/or may communicate with multiple computing devices such as, for example, database servers, compute servers, and the like. Multiple computing devices such as these may be in communication using a computer network and may communicate to act in cooperation as a computer server system. For example, such computing devices may communicate using a local-area network (LAN). In some implementations, the server computer system 102 may include multiple computing devices organized in a tiered arrangement. For example, the server computer system 102 may include middle-tier and back-end computing devices. In some implementations, the server computer system 102 may be a cluster formed of a plurality of interoperating computing devices.

The enterprise network 104 is a computer network and may be formed form one or more interconnected computer networks. For example, the enterprise network 104 may be or may include an Ethernet network, an asynchronous transfer mode (ATM) network, a wireless network, the like, and/or more than one of any or all of the foregoing. The enterprise network 104 may utilize the Transmission Control Protocol/Internet Protocol.

The public network 110 may include publicly accessible network resources and may include a combination of a variety of networks. Examples include the Internet, wireless local area networks (WLANs), LANs, Wireless Area Networks (WANs), and other such networks.

The plurality of user databases 114 may store account information for various registered users, including details regarding each account, and may store user profiles for registered users. The user profiles may include attributes of the user. In some cases, the attributes may be learned through a history of user activity with regard to the system and with respect to their account(s). In some cases, the attributes may be learned through responses to an active query process, as will be described further below. In some cases the user profiles may also include one or more goals or objectives, which may be selected or set by the user, in some cases in response to the active query process, and/or may be inferred based on user activity or response to the query process. The server computer system 102 may be configured to determine one or more recommendations based on the details of a user profile, such as the attributes, goals, and/or account history.

Figure 2:
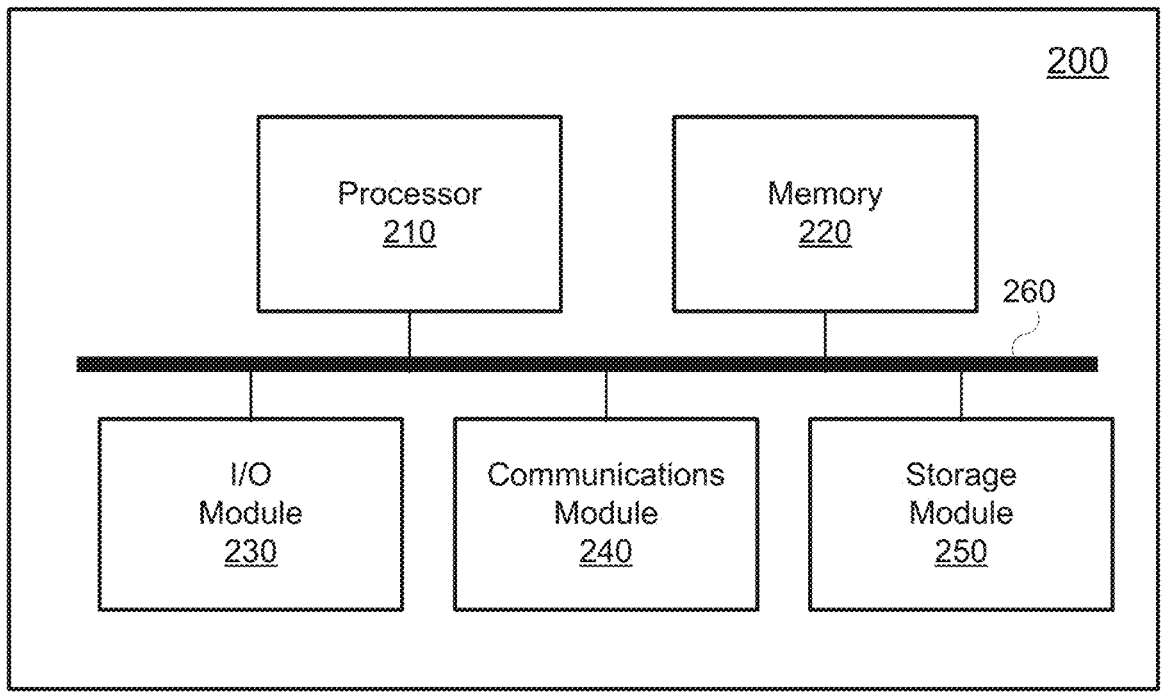
FIG. 2 depicts a high-level operation diagram of an example computing device.

Components of an example computing device 200 will now be discussed with regard to FIG. 2. In some embodiments, one or more instances of the example computing device 200 may serve as the end user device 106, the enterprise user interface device 112, and/or the server computer system 102.

The example computing device 200 includes a variety of modules. For example, as illustrated, the example computing device 200 may include a processor 210, a memory 220, an I/O module 230, a communications module 240, and/or a storage module 250. As illustrated, the foregoing example modules of the example computing device 200 are in communication over a bus 260.

The processor 210 is a hardware processor. The processor 210 may, for example, be one or more ARM, Intel ×86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 200.

The I/O module 230 is an input module and an output module. As an input module, the I/O module 230 allows the example computing device 200 to receive input from components of the example computing device 200. In some embodiments such as, for example, such as where the example computing device 200 corresponds to the end user device 106 or the enterprise user interface device 112, the I/O module 230 may allow the computing device 200 to provide output to and/or receive input from a display thereof. In another example, in some embodiment, such as, for example, the I/O module may allow the computing device 200 to provide output via a screen and/or to receive input from one or more input devices such as, for example, from a keyboard and/or a pointing device (e.g., a mouse, trackball, trackpad, or the like).

The communications module 240 allows the example computing device 200 to communicate with other computing devices and/or various communications networks, such as, for example, the public network 110 and/or the enterprise network 104. The communications module 240 may allow the example computing device 200 to send or receive communications signals. Communications signals may be sent or received according to one or more protocols or according to one or more standards. For example, the communications module 240 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 240 may allow the example computing device 200 to communicate via Wi-Fi™, using Bluetooth™ or via some combination of one or more networks or protocols. The communications module 240 may be integrated into a communications chipset.

The storage module 250 allows data to be stored and retrieved. In some embodiments, the storage module 250 may be formed as a part of the memory 220 and/or may be used to access all or a portion of the memory 220. Additionally or alternatively, the storage module 250 may be used to store and retrieve data from persisted storage other than the persisted storage (if any) accessible via the memory 220. In some embodiments, the storage module 250 may be used to store and retrieve data in/from a database. A database may be stored in persisted storage. Additionally or alternatively, the storage module 250 may access data stored remotely such as, for example, as may be accessed using a LAN, a WAN, a personal area network (PAN), and/or a storage area network (SAN). In some embodiments, the storage module 250 may access data stored remotely using the communications module 240. In some embodiments, the storage module 250 may be omitted and its function may be performed by the memory 220 and/or by the processor 210 in concert with the communications module 240 such as, for example, if data is stored remotely.

Software comprising instructions are executed by the processor 210 from a computer-readable medium. For example, software may be loaded into random-access memory from persistent storage of the memory 220. Additionally or alternatively, instructions may be executed by the processor 210 directly from read-only memory of the memory 220. Software may, in one example, cause one or more processors in the server computer system 102 (FIG. 1) to engage in a query process to build or refine a user profile and may determine a recommendation based on the refined user profile.

Figure 3:
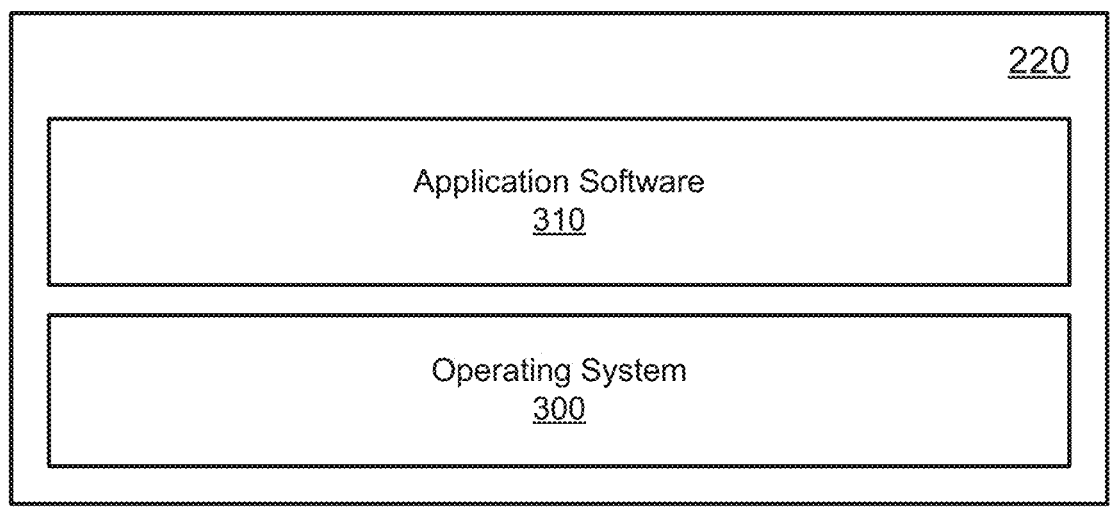
FIG. 3 depicts a simplified software organization exemplary of the example computing device of FIG. 2.

FIG. 3 depicts a simplified organization of software components stored in the memory 220 of the example computing device 200. As illustrated, these software components include an operating system 300 and an application software 310.

The operating system 300 is software. The operating system 300 allows the application software 310 to access the processor 210, the memory 220, the I/O module 230, the communications module 240, and the storage module 250 of the example computing device 200. The operating system 300 may be, for example, Google™ Android™, Apple™ iOS™, UNIX™, Linux™, Microsoft™ Windows™, Apple OSX™ or the like.

Where one or more instances of example computing device 200 correspond to one or more of the end user device 106, the enterprise user interface device 112, and/or the server computer system 102, the application software 310 may adapt the example computing device 200 to perform one or more associated functions. For example, the application software 310 may adapt instances of the example computing device 200 to authenticate login information received via one of the end user devices 106 or the enterprise user interface devices 112, and to retrieve a corresponding profile from the databases 114. The application software 310 may, in the case of the server computer system 102, cause one or more processors in the server computer system 102 to carry out a user profile building process, in part based on a query process. Queries may be transmitted to the end user devices 106 and/or enterprise user interface devices 112, at which corresponding application software 310 may present queries by way of a user interface through which responses may be received and relayed to the server computer system 102. In a specific example, the application software 310 at the end user devices 106 may correspond to an online banking and/or personal finance app.

In order to provide a registered user with useful recommendations, a server computer system obtains attributes regarding the registered user that characterize the user in a manner that assists in determining the suitability of recommendations. In addition, the server computer system may store goals or objectives associated with the user profile to assist in identifying suitable recommendations. The recommendations may relate to services available via the server computer system, where the server computer system has a large number of available services. In one example, the recommendations may be recommended application software that may be applicable or useful to the registered user based on the attributes and goals saved in the user profile. In another example the recommendations may be recommended consumer products that may be useful to the registered user based on the attributes and goals in the user profile. In another example, the recommendations may be recommended financial services or financial products that may be applicable or useful to the registered user based on the attributes and goals saved in the user profile. Other examples will be appreciated by those ordinarily skilled in the art.

The development of a user profile may occur through a number of ways. In one instance a user may provide attributes and goals during a registration process to create an account. In another instance, the server computer system may attempt to infer attributes and goals based on user activity within the server computer system. In the case of a query-based user profile building process, it may be advantageous to update the profile from time-to-time as the user's needs and wants evolve and the user's circumstances change. Moreover, the queries relevant to building a user profile may change based on responses to earlier queries, changes in circumstances, or the passage of time. The present application describes example user profile refinement processes based on a set of queries.

Another difficulty in identifying suitable recommendations arises in the case of a collective profile. A collective profile may be a profile associated with two or more users. An example of a collective profile is a family profile, where the family includes two or more individuals that each have an individual user profile. Another example of a collective profile is a corporate profile, which may be associated with user profiles of individual user profiles that are shareholders, directors, or officers. Yet another example collective profile is a partnership profile, where the partnership profile is associated with the individual profiles of the partners. Yet a further example of a collective profile is a joint venture profile, where the joint venture profile is associated with the profiles of the members of the joint venture, where the profiles of one or more of those members may be collective profiles.

By way of overview, the present application describes methods and systems that may allow for the determination of recommendations for a given user profile. In some instances, the methods and systems provide for refinement of a user profile through a query-based process. In some cases, the methods and systems provide for determination and output of a recommendation based on a refined profile. In some cases, the methods and systems provide process for refining a collective profile.

Figure 4:
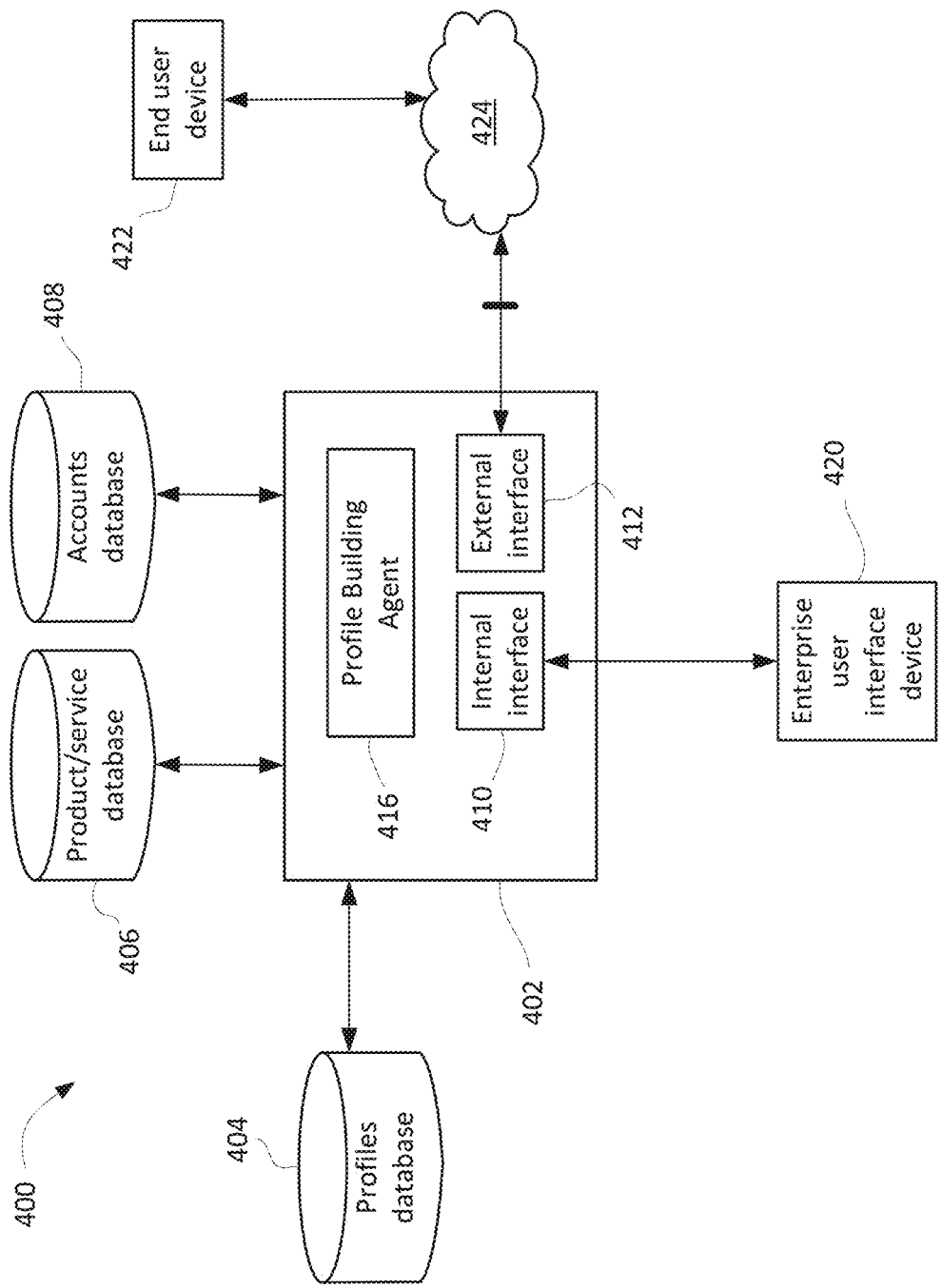
FIG. 4 diagrammatically shows an example system for determining recommendations.

Reference is now made to FIG. 4, which diagrammatically shows an example system 400 for determining recommendations. The system 400 includes a server computer system 402 and one or more databases, including a profile database 404, a product/service database 406, and an account database 408. While these are illustrated separately, in some implementations one or more of the databases may be implemented using the same storage medium or data structure. In some implementations, one or more of the databases may be implemented using multiple storage volumes and/or database structures. The profile database 404 may store profile data, including individual user profiles and collective profiles. The product/service database 406 may store information regarding the products and/or services available via the server computer systems 402 and their characteristics, restrictions, features, and/or cost. The account database 408 may store account data relating to user accounts, which may include usage information, history, balance information, and relationships between accounts, if any.

The server computer system 401 may include, among many components, an internal interface 410 for communicating with an enterprise user interface device 420 operating within an enterprise network, and an external interface 412 for communicating with an end user device 422 located external to the enterprise network and communicating via a network 424, such as the Internet. In some cases the external interface 412 and/or the internal interface 410 may include web server components for transmitting web pages, scripts, or other interface content, whether in HTML, XML, or other formats, and for receiving response messages and content from the end user device 422 and enterprise user interface device 420, respectively.

The server computer system 402 may further include a profile building agent 416. The profile building agent 416 may include one or more applications or other computer software within the server computer system 402 that, when executed, configures the server computer system 402 to carry out one or more the operations or processes described herein, including building a user profile, building a collective profile, refining profiles, determining recommendations, or other such processes.

In one example, the end user device 422 may transmit a request to the server computer system 402 for access to services, such as via a browser HTTP request or by way of an application executing on the end user device 422. Through a challenge-response process or through a security token passed with the request, or using some other authentication mechanism, the end user device 422 provides the external interface 412 with login credentials associated with a user profile. The external interface 412 or an associated authentication service verifies the received credentials and retrieves the associated user profile from the profile database 404.

The profile building agent 416 assesses the state of the retrieved user profile to determine whether it is complete and, even if complete, whether there are events or triggers that cause re-evaluation of the user profile and, in particular, its attributes and goals. The profile building agent 416 then manages the query-based process for building or refining the user profile. The profile building agent 416 may then also include the software instructions that, when executed, determine whether the refined or altered user profile leads to a recommendation. The recommendation may identify a product or services, details of which may be found in the product/service database 406.

Figure 5:
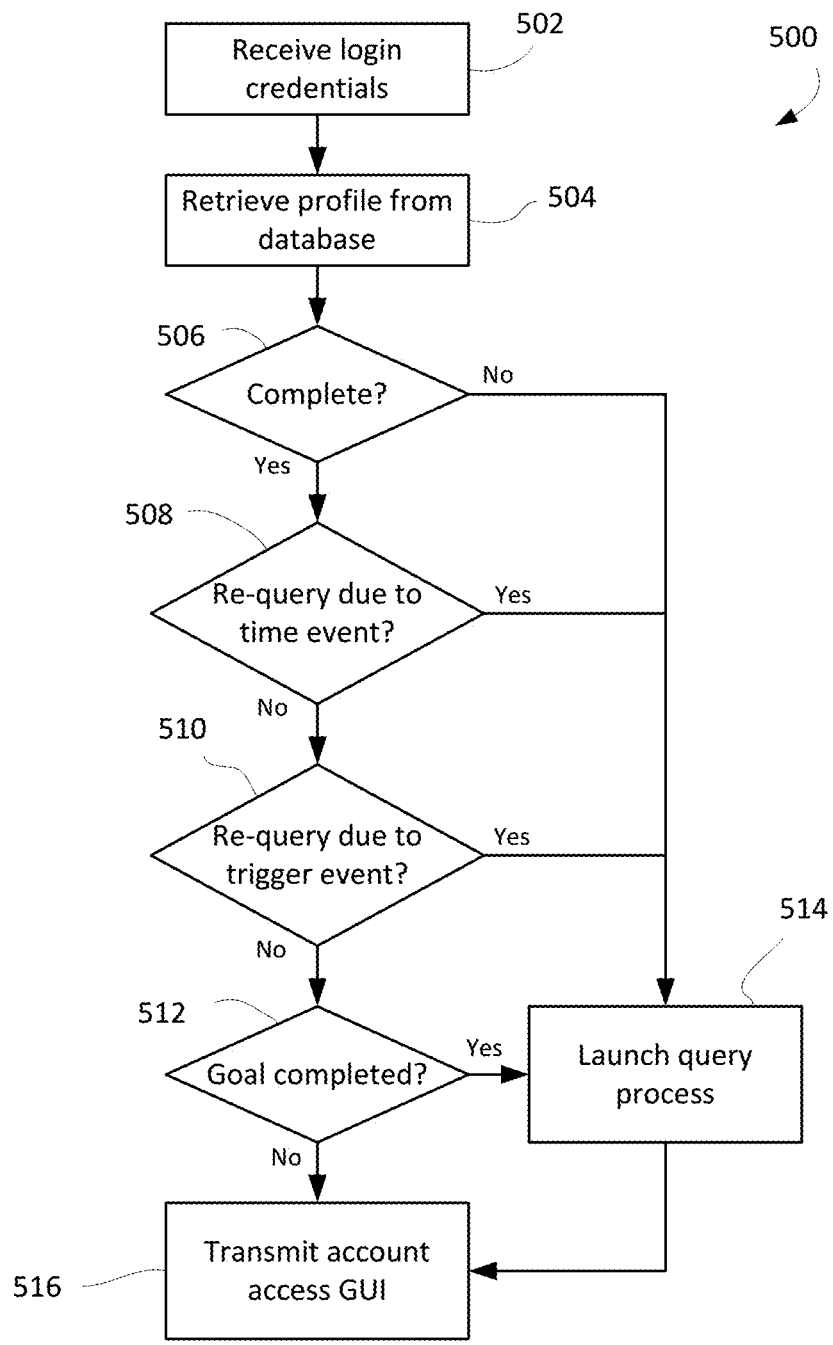
FIG. 5 shows, in flowchart form, one example method for determining that a user profile is to be modified.

Reference is now made to FIG. 5, which shows, in flowchart form, one example method 500 for determining that a user profile is to be modified. The method 500 may be implemented by way of computer-executable software instructions stored on a readable medium that, when executed, cause one or more processors and/or other computing elements to carry out the operations described. In one example, the software instructions are executable from within a server computer system, such as the example server computer system 402 (FIG. 4) described above.

In operation 502, the server computer system receives and authenticates login credentials from a client device. The client device may be an end user device or an enterprise user interface device. In one example, the enterprise user interface device may include a computing device operated by a customer service agent or the like that receives login data from the registered user. For example, the registered user may input their login data, whether manual through a user interface, or using a smart card, keypad, chip card, NFC communication, or through any other mechanism or combination of mechanisms.

In operation 504, the server computer system retrieves a user profile from a profile database based on the authenticate login credentials. As described above, the user profile may include personal identifying information for the registered user associated with the user profile. It may further include information regarding accounts associated with the registered user. In the example of a banking profile, the accounts may include, for example, one or more savings accounts, one or more chequing accounts, one or more investment accounts, one or more mortgage accounts, and/or one or more credit accounts. The user profile may further include one or more attributes associated with the registered user. These attributes may include characterizing data potentially relevant to recommendations regarding product or service suitability. In the example of a banking profile, the attributes may include credit score data, salary or other income data, spending history data, and the like. The user profile may also include a query history, which details which queries were asked and answered, the responses recorded, date information associated with responses, order of queries, and/or other data regarding the queries and responses.

The user profile may further include goal information that may have been determined as a result of the query process. In one example, the queries may directly present goal options or selections and a response to that query may specify a particular goal. In the example of banking, example goals may be in the nature of "buy a house", "buy a new car", "pay off mortgage", "build retirement savings", and the like. The goals may have associated measurable figures, such as "buy a $XXXX house", and/or a measurable timeline, such as "buy a $XXXXX house within two years". Other details may be specified in the goal data. In some cases, one or more goals may be inferred by the server computer system from user account history. As an example, a series of prepayments on a mortgage account may be suggest that the user has an objective of paying off the mortgage early. In some instances, determination of an inferred goal from account history data may result in the system proposing the goal during a query process and obtaining user confirmation or denial before recording the goal in the user profile.

After retrieving the user profile in operation 504, the server computer system may assess whether the query process should be initiated. The query process may be initiated if the user profile is incomplete or if there are external triggers that indicate that the user profile may need to be revised or updated. In operation 506, the server computer system evaluates if the user profile is incomplete. In some examples, an incomplete user profile may be identified if there are missing attributes, an incomplete query history, an incomplete goal record, or the like.

The query process may be structured in a tree-and-branch discovery process in which a response may increase the relevance of certain follow-up or more detailed questions and may decrease or eliminate the relevance of other questions. Accordingly, as each response is received, the subsequent series of queries (or query branches) may be re-configured. Moreover, the server computer system may be structured to avoid user fatigue by limiting the number of queries posed during any one session to a maximum number, such as 2, 3 or 4 queries. A subsequent session may result in continuation of the incomplete query process. The query history in the user profile may indicate which queries were posed, which responses were received, and may indicate a next query or series of queries to be posed in the process. Accordingly, an unfinished query process may be restarted with subsequent logins from the same registered user, even if received from different end user devices and/or enterprise user interface devices.

If the server computer system determines that the user profile is incomplete in operation 506, then it may launch the query process in operation 514. As noted above, this may include continuing an unfinished query process. The query process includes providing queries to the registered user through a user interface and receiving and recording responses. It may further include reconfiguring subsequent queries based on relevance in light of a received response.

If the user profile is complete, the method 500 may still result in launch of the query process in operation 514 if there are events that trigger a re-initiation of at least a portion of the query process. For example, in operation 508, the server computer system may assess whether one or more of the response in the query history and/or user attributes is to be re-evaluated due to expiry of time. That is, some responses may have an associated expiry time. In one example, the time component is related to a user age that may be specified in the attributes. For instance, when the user reaches a certain age, as indicated by a current date and a stored user birthdate, certain queries may become more relevant. In another example, a response to a specific query may be considered to be time limited, such that the system may benefit from re-asking the query periodically. If such a time event indicates a query should be re-asked, then the method 500 may proceed to operation 514 to launch the query process. For example a target date for a goal may have expired without the goal being met.

As another example, in operation 510 a trigger event may be detected in connection with one or more of the accounts associated with the user profile. The trigger event may include any change or series of changes with regard to one or more of the accounts that is correlated to a potential change in user attributes or goals. As an example, again in the context of a banking profile, a change in account value, such as by way of a relatively large lump sum deposit, may indicate a change in user circumstances resulting from a windfall that makes investment or purchase related queries more relevant and result in asking or re-asking certain queries to refine the user profile and, in particular, the user attributes and/or goals. As another example, an increase or decrease in a regular deposit, such as a salary, may indicate a change in user circumstances that may make certain queries more relevant. For example, a salary-related or goal-related query may lead to a change the user profile that may then produce a recommendation regarding products or services, such as an increase or decrease in mortgage top-up payments or increased or decreased automatic transfers to a savings account aimed as a desired future purchase goal.

In yet another example, operation 512 may include determination of whether a goal has been completed. Completion of a goal may increase the relevance of certain queries or may make re-asking certain queries advantageous. The determination of goal completion may be based on time-based events in operation 508 or based on account information in operation 510 or may be based on external information in operation 512. As an example, the goal may include purchase of a vehicle or home, which may not necessarily be reflected in the linked accounts, such as if the registered user obtained financing, if any, from an external provide, but data regard the occurrence of the goal completion may be obtainable through an external source or may inferred from other user data.

Other triggers may also result in initiating the query process. As an example, one or more social media accounts may be associated with a user profile. The server computer system may, through mining of social media data, identify an event that triggers initiation of the query process. As an example, such an event may include posts or other social media activity indicative of an event, such as a home or other purchase, job loss, job gain, health event, birth, marriage, or other occurrence that may be relevant to updating of attributes and/or goals. As an illustration, determination that a user has recently had a child may be impact the relevance of queries relating to registered education savings plans, insurance, or other child-related products or services.

After either launching the query process in operation 514 or determining that the query process need not be launched, then the method 500 includes presenting the account access GUI to the client device as a result of the login, as indicated by operation 516.

Although many of the examples provided herein relate to a banking profile with associated banking or financial accounts, it will be appreciated that the present application is not limited to that context and may be applicable to other types of profiles and associated accounts.

Figure 6:
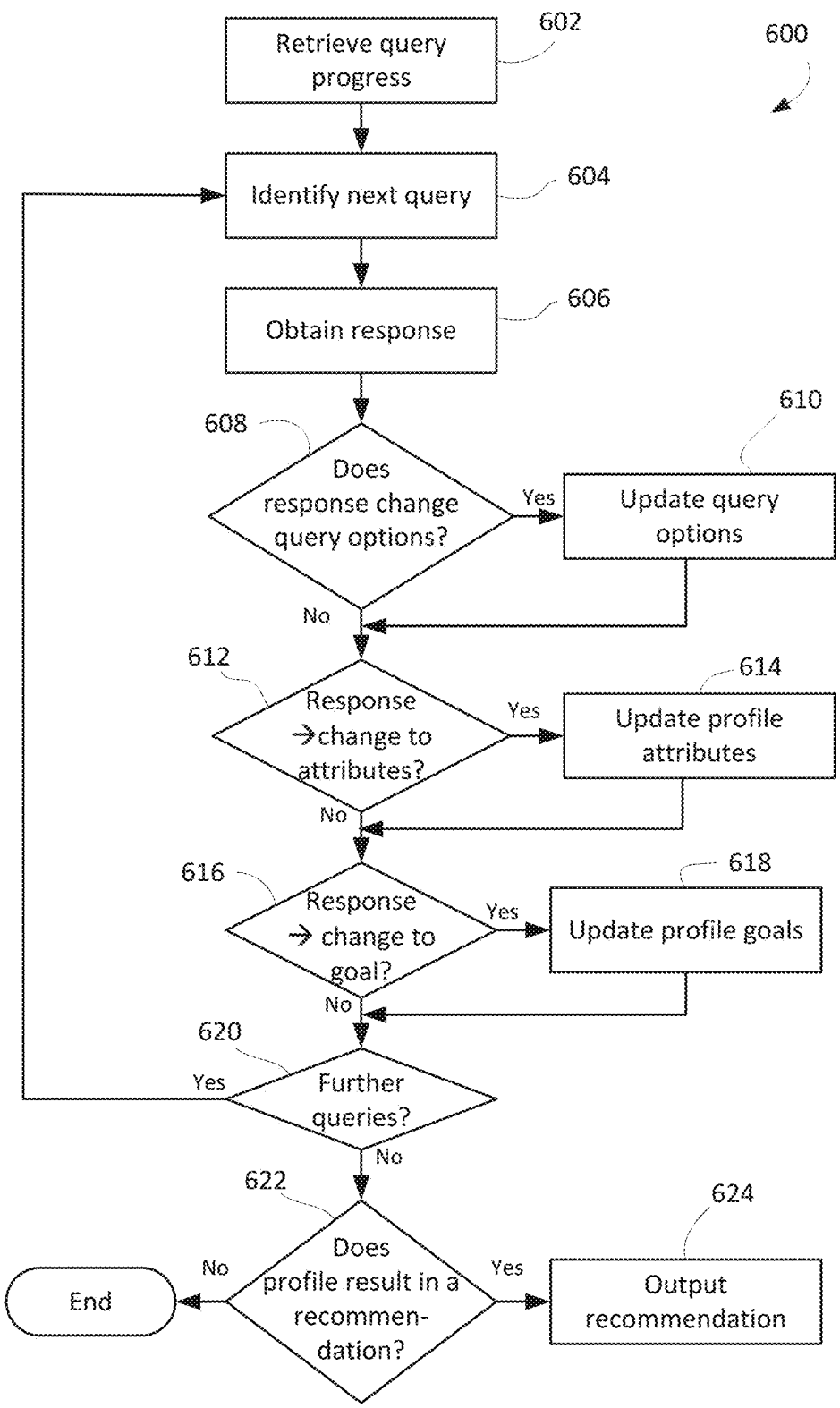
FIG. 6 shows, in flowchart form, one example method for determining a recommendation via a query process.

Reference is now made to FIG. 6, which shows, in flowchart form, one example method 600 for determining a recommendation via a query process. The query process may be triggered or initiated as a result of a determination by the server computer system following login to a user profile, as described above in connection with FIG. 5, or may be triggered or initiated in some other manner. The query process is initiated in connection with an identified user profile.

In operation 602, the query progress is determined, for example from reading the query history from the user profile. The query history may include the questions posed, the responses received, and/or unasked questions. The query history may include an order for unasked questions and/or a quantified relevance of each question. In some cases, the query history may provide a reference to a plurality of questions stored elsewhere in the server computer system. For example, a master group of queries or a plurality of groups of queries for specified types of users may be stored and maintained by the server computer system, and the user profile may include a reference or index indicating which group or sub-group of queries is applicable to the user profile. The query history may include data indicating which queries in the group of queries have been asked and answered. The response data may be stored in the query history or elsewhere in the user profile.

In operation 604, the server computer system identifies a query. The query identified may be a next query in a series of queries specified by the query history or by the master group of queries, in some cases. The query may be identified through determining the quantified relevance of each of the queries based on the current user profile, and selecting the unanswered query with the highest relevance ranking. In some implementations, the query may be the next query in a predetermined series of queries following the most-recently-posed query identified by the query history. The identified query is then posed to the registered user. In some implementations the query is posed by transmitting the query to the end user device or enterprise user interface device used to log into the user profile. The query may be output on the end user device via a GUI interface associated with the application through which the user submitted user credentials for logging into the user profile.

Some queries may be yes/no queries. Some queries may offer a pick list of options, one of which may be "none of the above", in some cases. In some such cases, one item may be selected; in some cases multiple items may be selected from the pick list. Some queries may request a ranking of items in priority. Some queries may be open-ended and permit the user to provide a narrative answer.

In operation 606 a response is received by the server computer system. As noted above, the nature of the response may depend on the format of the query.

In operation 608, the server computer system may determine whether the response alters the query process. For example, a response may foreclose further queries of a certain type. As an example, if a query is posed regarding interest in investment advice, and a negative response is received, or a response is received indicating that the user is disinterested in a certain line of products, then further queries relating to those issues may be of little value and, in fact, may simply irritate the user. In this sense, the response may alter the relevance of other unasked queries. In some cases, the response may render some queries wholly irrelevant, i.e. with a relevance score of zero. In some cases, the response may increase the relevance ranking of some queries. If the response impacts the relevance of the unasked queries, then in operation 610 the query process may be updated to restructure or re-prioritize the query process to ensure the most relevant queries are the next to be posed.

In operation 612, the server computer system determines whether the response alters the attributes stored in the user profile. Not all queries may be relevant to attributes in the user profile, but some may be. If the query response either provides a new attribute to be stored in the user profile, or provides an update to an existing attribute in the user profile, then in operation 614 the user profile attributes are updated.

In operation 616, the server computer system determines whether the response alters the goals stored in the user profile. Not all queries may be relevant to goals, but some may affect goals or set new goals. For example, the query may directly invite the user to accept or set a goal. As another example, the query may indirectly elicit goal related information or information relevant to a goal, such as marital status data, salary information, or other persons attribute details that may nonetheless be relevant to the details of an existing goal. If information is obtained in the response that is relevant to setting a new goal or modifying an existing goal, then in operation 618 the goals in the user profile are so modified.

In operation 620, the server computer system may determine whether to continue the query process. The determination may be based on the relevance scores of unasked queries, which may be updated in operation 610. If there are no unasked queries with a relevance score above a minimum threshold then the process may be ended. In some cases, the determination may be based on the number of queries asked in the current session to avoid over burdening a user with more than a maximum number of consecutive queries. In some cases, it may be that there are no unasked queries remaining.

If the query process ends, then in operation 622 the server computer system may determine whether the updated user profile results in a recommendation. The server computer system may include a recommendation engine for evaluating the user profiles, including its goals, attributes, account data, and any other information, in combination with product and service details to identify a potential product or service to be recommended. The recommendation engine may take into account product or service offering of a temporal nature, such as limited time discounts or promotions that may apply to potential products or services. The recommendation engine may be based on artificial intelligence trained with a large set of training data and having a feedback mechanisms, based on a neural network or other machine learning system, based on a set of pre-established logic rules, or some combination thereof.

If a recommendation is identified, then the server computer system may output the recommendation. In some cases, this output is transmitted to the end user device within the current session, prompting a user interface change to present the recommendation, such as via a pop-up, notification, ad insert, or in any other such manner. In some cases, the output is transmitted outside the current session using a messaging paradigm, such as email, text message, instant message, automated telephone call, or messaging from within the application relating to the accounts. The recommendation may include a link or other actionable user interface element that, if selected by the user, results in an action further to obtaining the product or service. For example, it may launch a session with a storefront offering the product or service. It may result in a message to a suitable customer service representative for the product or service. It may result in creation of a calendar event involving the user and the customer service representative. In one example, the calendar event and/or message to the customer service representative includes the altered attribute and/or goal that triggered the new recommendation. It may further include additional user information or a link to at least a portion of the user profile data.

Once the query process has been completed, for example after the user has logged into their user profile and has answered queries, then the session continues with providing the user with access to the services available through their account interface.

Figure 7:
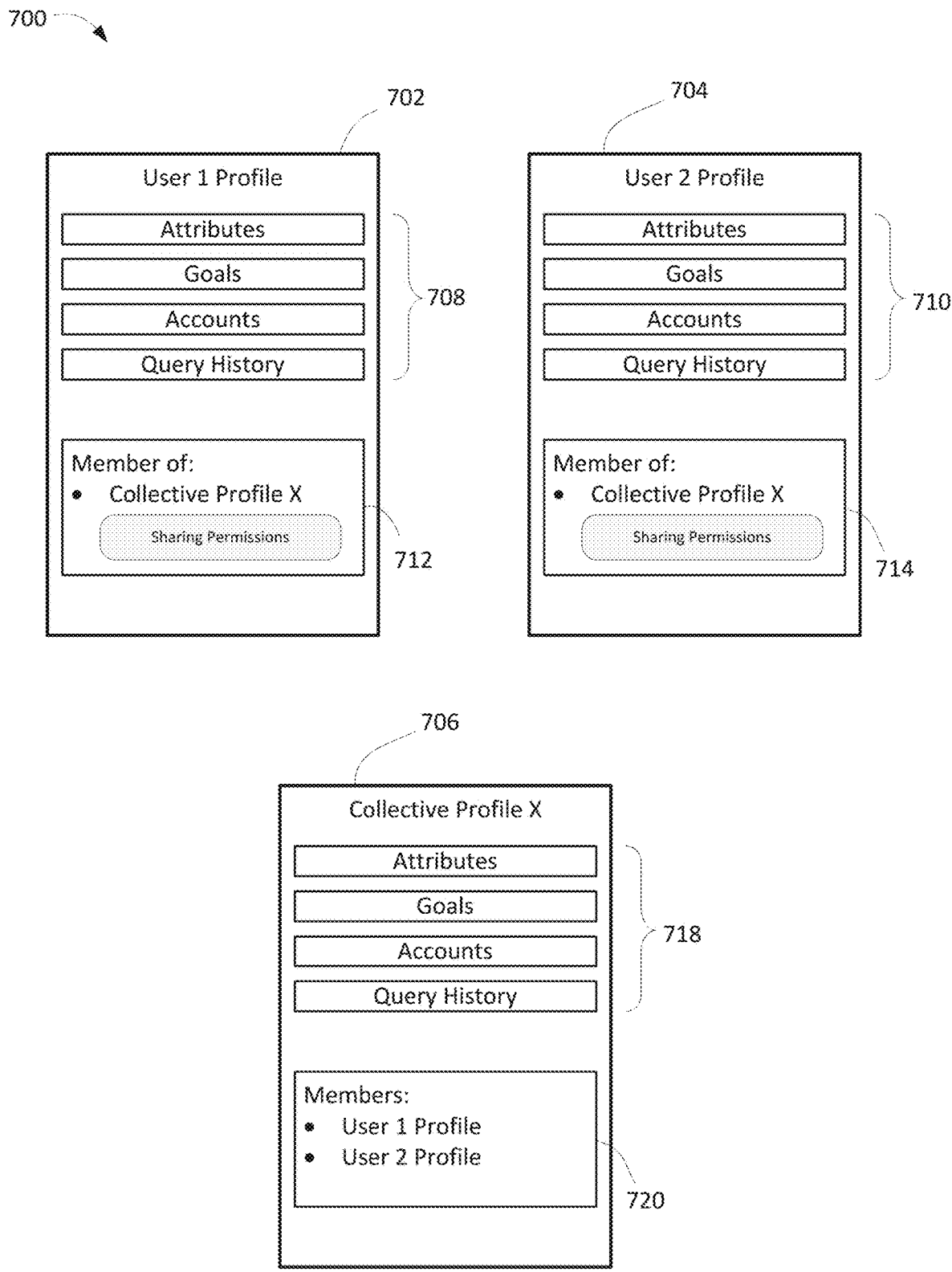
FIG. 7 diagrammatically illustrates example profiles.

Reference will now be made to FIG. 7, which diagrammatically illustrates example profiles 700. Each example profile 700 may be a data structure containing structured information and stored in a persistent memory, such as a profile database, and indexed to enable search and retrieval.

The example profiles 700 may include a User 1 profile 702 and a User 2 profile 704. The User 1 profile 702 and the User 2 profile 704 relate to respective individual registered users. The User 1 profile 702, for example, contains user-specific information 708 such as attributes, accounts, goals, and query history. As described above, the attributes and goals may be built through a query-based discovery process. The accounts include information identifying one or more accounts associated with the user profile. For example, in the case of an online sales platform, the accounts may include one or more purchasing accounts and one or more vendor accounts. As another example, in the case of a banking system, the accounts may include savings, chequing, investment, retirement, and/or credit/loan accounts. The account information stored in the user profile may include account numbers or other such data identifying the accounts. Details regarding the accounts may be stored in a separate data structure detailing the accounts, such as in an accounts database. The User 2 profile 704 includes user-specific information 710 detailing the attributes, goals, accounts, and query history relating to the second registered user.

The example profiles 700 further include a collective profile 706. The collective profile 706 is a profile relating to a non-individual entity and linked to two or more individual profiles, like the User 1 profile 702 and the User 2 profile 704. The collective profile 706 includes linking data 720 referencing or linking to the individual profiles. Likewise, the individual profiles that are connected to a collective profile include membership data 712, 714 identifying the collective profile to which they are linked. Like the individual profiles, the collective profile 706 includes collective information 718, such as attributes, accounts, goals, and query history. The attributes and goals details attributes and goals associated with the collective. The accounts identify one or more accounts associated with the collective. The query history details the history of questions and response relating to the collective.

The membership data 712, 714 in the individual profiles that identifies a collective profile to which the individual profiles are linked may further include sharing permissions data. The sharing permissions data may identify portions of the user profile that are hidden from visibility to other individuals linked to the collective profile or, conversely, those portions of the user profile that are visible to other individual linked to the collective profile. For example, the User 1 profile 702 may have sharing permissions indicating that all of User 1's attributes and goals are to be accessible to User 2 when User 2 is logged into the collective profile 706. In some cases, only individual attributes or goals may be designated as shared.

Collective profiles may relate to any non-individual entity applicable to a given implementation context. For example, in some cases the collective profiles may be "family" profiles, and individuals are members of the family. As another example, the collective profile may be a "partnership" profile, and individuals that are partners in the partnership are members.

Problems arise in building collective profiles since more than one individual may be involved, leading to conflict in the determination of attributes and goals. There may also be issues in resolving such conflicts relating to the maintenance of privacy over individual data.

Figure 8:
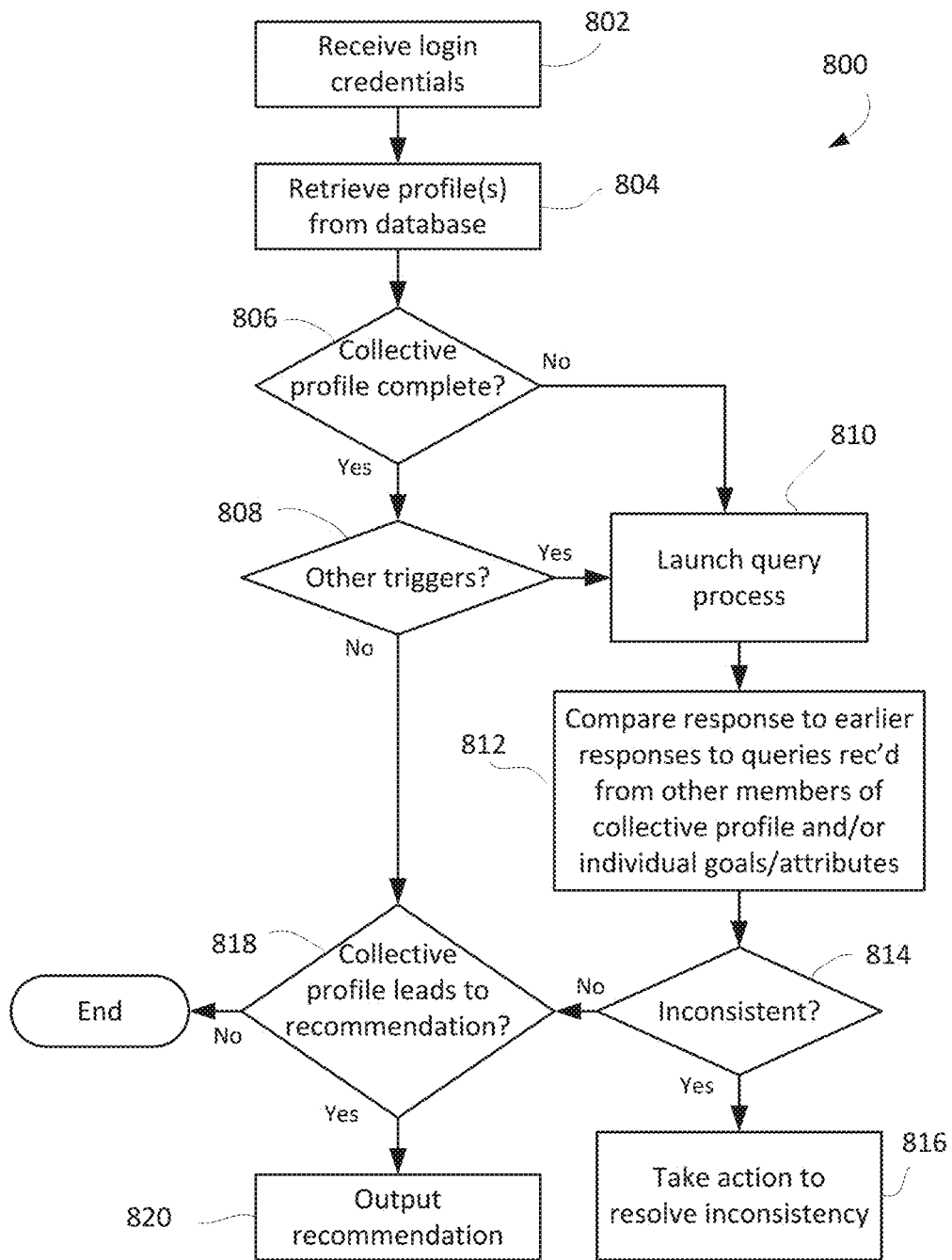
FIG. 8 shows, in flowchart form, one example method for determining a recommendation in connection with a collective profile.

In one aspect, the present application provides a method and system for generating recommendations in relation to a collective profile. Reference is now made to FIG. 8, which shows, in flowchart form, one example method 800 for determining a recommendation when building a collective profile. In operation 802, the server computer system received login credentials relating to a user profile. The server computer system authenticates the credentials and, in operation 804, retrieves the associated user profile. The user profile includes linking data indicating that the user is also a member of a collective profile. Accordingly, the server computer system further retrieves the collective profile.

In operation 806, the server computer system may assess whether the collective profile is complete. As discussed above in connection with individual profiles, the determination as to whether the collective profile is complete may be based on the query history stored in the collective profile. If the profile is incomplete, the query process may be initiated in operation 810. As indicated by operation 808, other triggers may also lead to initiating the query process in operation 810. Other triggers may include determining that a goal has been completed, determining that a time-related event has occurred, such as expiry of a response or occurrence of a time milestone, or identifying an account-related change in circumstances. In the case of banking, this may include a lump sum deposit, withdrawal, or change in patterns of usage, as examples.

The query process in operation 810 may be carried out in a similar manner to that described above in connection with FIG. 6, in which certain queries are identified and posed to the user via a GUI, and responses are received and their impact on the collective profile is assessed and the profile is updated. In the case of the collective profile, however, the same or related queries may be posed to each of the individual users linked to the collective profile, often at different times. Accordingly, in operation 812, one or more response received from one of the individual users may be compared with one or more responses received earlier from one or more other individual users linked to the collective profile. As indicated by operation 814, the server computer system may determine whether or not an inconsistency is detected in the query response from respective individuals. It may be appreciated that not all query responses are inconsistent merely because they are not identical; however, in some cases, query responses are sufficiently different or are in direct conflict such that an inconsistency is detected.

If no inconsistency is detected at the termination or suspension of the query process, then in operation 818, the server computer system may determine whether the updated collective profile results in a recommendation regarding a product or service and, if so, that recommendation is output in operation 820. However, if an inconsistency is detected in operation 814, then the server computer system may take an action to resolve the inconsistency in operation 816. The action to resolve the inconsistency may be implemented in various ways in different embodiments. In one example, the action includes notifying the currently-logged-in user that one or more responses is inconsistent with responses provided by another member of the collective. In some cases a notification may be sent to the another member indicating that the currently-logged-in user has provided an inconsistent query response. In some embodiments, all members of the collective may be notified.

In yet a further example, notifications may or may not be sent to the members, but each of the members may, at their next session, be provided with further queries aimed at resolving the inconsistency. The further queries may directly pose a query offering two or more selectable options and, if further inconsistency results, notifications may be sent regarding the unresolved inconsistency.

In some examples, an internal notification may be generated and sent to a suitable customer service agent noting the inconsistency to enable the customer service agent to actively attempt resolution.

To illustrate through use of the banking context as an example, in the case of a family profile, one of the family members may provide query responses that indicate a particular risk tolerance for investments, prioritizing a certain goal like mortgage pre-payment, or indicating interest in a future purchase like a new car, or some other attribute or goal, and that query response may be in conflict with a response provided by another family member in response to an earlier query question. The earlier response may indicate a significantly different risk tolerance, a different priority or goal in conflict with mortgage pre-payment, or prioritizing a different future purchase. The inconsistency is such that attributes or goals associated with the family profile cannot be updated because of the conflict in response, and suitable recommendations cannot be made because the inconsistent response would result in inconsistent attributes or goals and inconsistent recommendations.

In one implementation example, the action taken in operation 816 may include notifying the individual members of the collective profile and scheduling a joint session. During the joint session, the individual members may be queried through respective interfaces regarding the conflict and presented with resolution options for selection. The server computer system may thus facilitate resolution of the inconsistency and a consensus update of the collective profile.

In yet another example implementation, in operation 814 the server computer system may determine whether there is an inconsistency detected in connection with the responses provided by a current user and either that current user's personal profile or the individual profiles of other users that are members of the collective profile. That is, a response, whether relating to an attribute or goal of the collective profile, may be in conflict with an attribute or goal in the individual profile of the user providing the response, or may be in conflict with an attribute or goal in the individual profile of another user linked to the collective profile.

As an example, using the banking context, a first user may provide a response in connection with a query relating to the collective profile that sets a goal or defines an attribute that requires a certain level of income or input from another individual. For instance, a goal may be set to save $20,000 per year in a savings account for a down-payment. The server computer system may determine from the current individual profile and the individual profiles of the other members of the family profile that such a goal is unattainable. For example, another member of the family profile may have attributes and/or goals in their profile that are inconsistent with a family goal of saving that quantity of money in a year. For example, the other individual profile may have a goal involving paying off a student loan in a certain time period, or the individual profile may have account data and attributes that indicate less than $2000 per year in available income to contribute to a family savings goal. The server computer system may thus determine that the response provided in connection with the collective profile results in a conflict with a response or other attributes associated with one of the linked individual profiles.

The taking of an action in operation 816 may involve determining, from one or more of the user profiles, whether certain information regarding the inconsistency may be provide to other users in a notification. For example, sharing permissions in a first user profile may indicate that only certain attributes or goals or account data may be shared with other members of the collective profile. Accordingly, when notifying the other members of the collective regarding the inconsistency, the server computer system may insert information in the notification regarding the inconsistency dependent upon the sharing permissions associated with that information.

It will be appreciated that the collective profile building is thus conditional on receiving responses to profile building queries that are not inconsistent with earlier received responses from other the individual users associated with the collective profile to ensure a consensus is inherent in the updated attributes and goals of the collective profile. It may also be conditional on receiving responses that are not inconsistent with attributes and/or goals associated with individual profiles linked to the collective profile.

For ease of explanation, the above-description of profiles presupposes that they are stored and available in readable format, like plain text; however, it will be appreciated that for security purposes the profiles and much of the other data discussed may be stored in encrypted form and many of the above-described operations may involve decrypting stored data before accessing and manipulating the data, and encrypting modified data before re-storing it.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A server computer system comprising:
   a persistent storage containing at least a first profile, a second profile and a collective profile linked to the first profile and to the second profile;
   a processor coupled to the persistent storage; and
   a memory coupled to the processor, the memory storing instructions that, when executed, are to configure the processor to:
      authenticate a login request from an end user device in association with the collective profile based on credentials associated with the first profile;
      identify a query from among a plurality of queries and transmit the query to the end user device;
      receive a response to the query;
      determine that the response is not inconsistent with one or more earlier responses received in association with the second profile and, in response, refine at least one attribute or goal in the collective profile based on the response to generate and store a refined collective profile; and
      determine whether the refined collective profile results in a new recommendation and, when so, outputting the new recommendation.

2. The server computer system of claim 1, wherein the instructions, when executed, are to further configure the processor to output data to the end user device for display on a graphical user interface, the data including attributes, account information and goals stored in the collective profile and the first profile, and including at least some shared data from the second profile and excluding at least some private data from the second profile.

3. The server computer system of claim 2, wherein the shared data in the second profile includes associated permissions set to permit sharing of the shared data with the collective profile, and wherein the private data in the second profile includes associated permissions set to prevent sharing of the shared data with the collective profile.

4. The server computer system of claim 1, wherein the instructions, when executed, are to further configure the processor to test whether the response is consistent with attributes or goals stored in the first profile and, when not, to output a notification to the end user device.

5. The server computer system of claim 1, wherein the instructions, when executed, are to further configure the processor to test whether the response is consistent with attributes or goals stored in the second profile and, when not, to output a notification to the end user device.

6. The server computer system of claim 1, wherein the instructions, when executed, are to further configure the processor to:
   identify a second query from among the plurality of queries and transmit the query to the end user device;
   receive a second response to the second query; and
   determine that the second response is inconsistent with a second earlier response received in association with the second profile and, in response, transmitting a first notification to the end user device and a second notification to an address associated with the second profile, the first notification and the second notification advising that an inconsistency is detected in building of the collective profile.

7. The server computer system of claim 1, wherein the instructions, when executed, are to further configure the processor to output the new recommendation by sending a notification to an address associated with the new recommendation.

8. The server computer system of claim 7, wherein the instructions, when executed, are to further configure the processor to send the notification to the address associated with the new recommendation by identifying a customer service representative associated with a product or service identified in the new recommendation and determining the address associated with the customer service representative.

9. The server computer system of claim 8, wherein the notification includes data highlighting the at least one attribute or goal refined in the collective profile that results in the new recommendation.

10. The server computer system of claim 1, wherein the instructions, when executed, are to further configure the processor to identify a query by determining that the collective profile is incomplete, retrieving a query history stored in association with the collective profile, and identifying a next query in a series of queries among the plurality of queries for which no response has been received in association with the first profile.

11. The server computer system of claim 1, wherein the instructions, when executed, are to further configure the processor to identify a query by detecting a trigger event in association with a goal contained in, or an account linked to, the collective profile.

12. The server computer system of claim 11, wherein the trigger event includes one or more of an increase in value of the account over a first level, a transaction in the account over a maximum quantity, a change of more than a second amount in a regular transaction in the account, or a completion of the goal.

13. A computer-implemented method comprising:
   storing, in memory, a first profile, a second profile and a collective profile linked to the first profile and to the second profile;
   authenticating a login request from an end user device in association with the collective profile based on credentials associated with the first profile;

identifying a query from among a plurality of queries and transmit the query to the end user device;

receiving a response to the query;

determining that the response is not inconsistent with one or more earlier responses received in association with the second profile and, in response, refining at least one attribute or goal in the collective profile based on the response to generate and store a refined collective profile; and determining whether the refined collective profile results in a new recommendation and, when so, outputting the new recommendation.

14. The method of claim 13, further comprising testing whether the response is consistent with attributes or goals stored in the first profile and, when not, to output a notification to the end user device.

15. The method of claim 13, further comprising testing whether the response is consistent with attributes or goals stored in the second profile and, when not, to output a notification to the end user device.

16. The method of claim 13, further comprising:

identifying a second query from among the plurality of queries and transmit the query to the end user device;

receiving a second response to the second query; and determining that the second response is inconsistent with a second earlier response received in association with the second profile and, in response, transmitting a first notification to the end user device and a second notification to an address associated with the second profile, the first notification and the second notification advising that an inconsistency is detected in building of the collective profile.

17. The method of claim 13, further comprising outputting the new recommendation by sending a notification to an address associated with the new recommendation, and wherein sending includes identifying a customer service representative associated with a product or service identified in the new recommendation and determining the address associated with the customer service representative.

18. The method claimed in claim 13, wherein identifying a query includes determining that the collective profile is incomplete, retrieving a query history stored in association with the collective profile, and identifying a next query in a series of queries among the plurality of queries for which no response has been received in association with the first profile.

19. The method claimed in claim 13, wherein identifying a query includes detecting a trigger event in association with a goal contained in, or an account linked to, the collective profile, and wherein the trigger event includes one or more of an increase in value of the account over a first level, a transaction in the account over a maximum quantity, a change of more than a second amount in a regular transaction in the account, or a completion of the goal.

20. A non-transitory computer-readable storage medium storing instructions, that, when executed by a processor of a computer system, cause the computer system to:

store, in memory, a first profile, a second profile and a collective profile linked to the first profile and to the second profile;

authenticate a login request from an end user device in association with the collective profile based on credentials associated with the first profile;

identify a query from among a plurality of queries and transmit the query to the end user device;

receive a response to the query;

determine that the response is not inconsistent with one or more earlier responses received in association with the second profile and, in response, refine at least one attribute or goal in the collective profile based on the response to generate and store a refined collective profile; and determine whether the refined collective profile results in a new recommendation and, when so, outputting the new recommendation.

* * * * *